(12) United States Patent
Shimura et al.

(10) Patent No.: US 11,488,783 B2
(45) Date of Patent: Nov. 1, 2022

(54) MULTILAYER CERAMIC CAPACITOR AND MANUFACTURING METHOD THEREFOR

(71) Applicant: TAIYO YUDEN CO., LTD., Tokyo (JP)

(72) Inventors: Tetsuo Shimura, Tokyo (JP); Yasuyuki Inomata, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 204 days.

(21) Appl. No.: 16/912,494

(22) Filed: Jun. 25, 2020

(65) Prior Publication Data
US 2020/0411249 A1    Dec. 31, 2020

(30) Foreign Application Priority Data

Jun. 27, 2019  (JP) .............................. JP2019-119664

(51) Int. Cl.
| | |
|---|---|
| *H01G 4/30* | (2006.01) |
| *H01G 4/012* | (2006.01) |
| *H01G 4/12* | (2006.01) |
| *H01G 4/248* | (2006.01) |

(52) U.S. Cl.
CPC .............. *H01G 4/30* (2013.01); *H01G 4/012* (2013.01); *H01G 4/1245* (2013.01); *H01G 4/248* (2013.01)

(58) Field of Classification Search
CPC ........ H01G 4/30; H01G 4/012; H01G 4/1245; H01G 4/248
USPC ................ 361/301.4, 321.1, 311, 320, 321.4
See application file for complete search history.

(56) References Cited

U.S. PATENT DOCUMENTS

| | | |
|---|---|---|
| 2015/0279564 A1 | 10/2015 | Naito |
| 2017/0018358 A1 | 1/2017 | Isota et al. |

FOREIGN PATENT DOCUMENTS

| | | | | |
|---|---|---|---|---|
| JP | 2015-195352 A | 11/2015 | | |
| JP | 2017-28254 A | 2/2017 | | |
| JP | 2019033243 A | * | 2/2019 | ............. H01G 4/008 |

* cited by examiner

*Primary Examiner* — Arun Ramaswamy
(74) *Attorney, Agent, or Firm* — Chen Yoshimura LLP (57) ABSTRACT

A multilayer ceramic capacitor includes a laminated body in which dielectric layers and internal electrodes are laminated alternately. The dielectric layer includes a first phase that contains calcium strontium zirconate titanate as a main component thereof and a second phase that contains barium zirconate as a main component thereof. At a cross section of the dielectric layer, a line parallel to the direction in which the dielectric layers and the internal electrodes are laminated contacts the boundaries between the first phase and the second phase once or more on average, thereby the statistically averaged contact number N of such a line with the boundaries determined by a prescribed procedure being 1.0 or greater.

5 Claims, 7 Drawing Sheets

MULTILAYER CERAMIC CAPACITOR AND MANUFACTURING METHOD THEREFOR

BACKGROUND OF THE INVENTION

Technical Field

The present invention is related to a multilayer ceramic capacitor and its manufacture method.

Background Art

In the manufacture of a multilayer ceramic capacitor (MLCC) for temperature compensating use, a paraelectric perovskite system oxide material in which the main component made of $(Ba, Sr, Ca)(Zr, Ti)O_3$ is doped with additives is used as the ceramic material (Patent Document 1). The dielectric constant of such materials is typically about 30 to 40. In recent years, for further miniaturization of devices, multilayer ceramic capacitors are becoming thinner and thinner (Patent Document 2).

RELATED ART DOCUMENT

Patent Document

Patent Document 1: Japanese Patent Application Laid-Open Publication No. 2015-195352
Patent Document 2: Japanese Patent Application Laid-Open Publication No. 2017-28254

SUMMARY OF THE INVENTION

The permittivity of these materials for temperature compensating use is smaller than that of materials for high-dielectric constant use. Therefore, in order to miniaturize the multilayer ceramic capacitors for temperature compensating use, the dielectric layers need to be made thinner. However, when the dielectric layers are made thinner, a dielectric breakdown—a phenomena where current flows between internal electrodes that are electrically isolated by the dielectric layers—is more likely to occur. Because of this, it is necessary to improve the reliability against dielectric breakdown in the materials used for the dielectric layers.

Furthermore, when Ni (nickel) is used for the internal electrodes of the multilayer ceramic capacitor, a laminated body in which the internal electrodes and the dielectric layers are laminated needs to be sintered in a reducing atmosphere. Here, when the material for the dielectric layers is mainly $(Ba, Sr, Ca)(Zr, Ti)O_3$, Ti ions included in the material may exhibit electrical conductivity due to the reducing atmosphere. Therefore, the reliability against dielectric breakdown in the dielectric layer needs to be further improved.

The present invention is devised in view of the foregoing, and aims to provide a temperature compensation use multilayer ceramic capacitor having a high reliability against dielectric breakdown and its manufacture method.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multilayer ceramic capacitor, comprising: a laminated body in which dielectric layers and internal electrodes are laminated alternately in a prescribed direction; a pair of external electrodes disposed on the laminated body to respectively connect to different sets of the internal electrodes in the laminated body, wherein each of the dielectric layers includes a first phase that has calcium strontium zirconate titanate as a main component thereof and a second phase that has barium zirconate as a main component thereof such that boundaries exist between the first phase and the second phase, and wherein at a cross section of the laminated body taken along a plane parallel to the prescribed direction, an average contact number that is defined and determined by prescribed steps for at least one of the dielectric layers that are sandwiched by the internal electrodes is 1.0 or greater, said prescribed steps including: (a) selecting, from the cross section, a region having a prescribed length and containing a single pair of the internal electrodes sandwiching one of the dielectric layers, wherein the prescribed length is 30 μm or greater, as measured in a direction perpendicular to the prescribed direction in which the dielectric layers and the internal electrodes are laminated; (b) drawing, on the selected region of the cross section, ten or more straight lines that are parallel to the prescribed direction in which the dielectric layers and the internal electrodes are laminated at an interval of 3 μm or greater; (c) counting a total number of points of contact at which the respective ten or more straight lines contact the boundaries between the first phase and the second phase; and (d) calculating the average contact number by dividing said total number of points of contact obtained in step (c) by a number of the straight lines.

In the above-described multilayer ceramic capacitor, the average contact number may be set to 2.0 or greater.

In the above-described multilayer ceramic capacitor, a thickness of each of the dielectric layers may be set to 2 μm to 10 μm.

In the above-described multilayer ceramic capacitor, in each of the dielectric layers, a mole ratio of a total number of moles of strontium and calcium to a number of moles of barium may be set to 97:3 to 3:97.

In the above-described multilayer ceramic capacitor, in each of the dielectric layers, a mole ratio of a total number of moles of strontium and calcium to a number of moles of barium may be set to 97:3 to 77:23.

In another aspect, the present invention provides a method for manufacturing a multilayer ceramic capacitor, comprising: mixing a first material that contains particles of calcium strontium zirconate titanate with a volume-based median particle diameter d50 of 50 nm to 200 nm and a second material that contains particles of barium zirconate with a volume-based median particle diameter d50 of 50 nm to 200 nm in a mixing ratio of a total number of moles of strontium and calcium to a number of mole of barium being 97:3 to 3:97, thereby obtaining a mixed material; forming a plurality of green sheets from the mixed material; printing an internal electrode on each of a select set of the plurality of green sheets; thereafter, laminating the plurality of green sheets, thereby forming a laminated body; sintering the laminated body in a reducing atmosphere that includes hydrogen in such a condition that boundaries exist between a first phase that contains calcium strontium zirconate titanate as a main component thereof and a second phase that contains barium zirconate as a main component thereof in the sintered laminated body; and forming external electrodes on the sintered laminated body.

In the above-described method, the sintering may be performed at a temperature of 1220° C. to 1280° C. for a duration of 3 min to 5 min.

In the above-described method, a value obtained by dividing the volume-based median diameter d50 of the first material by the volume-based median diameter d50 of the second material may be set to 0.8 to 1.2.

The above-described method may further include before laminating the plurality of green sheets, but after the printing of the internal electrode, cutting the plurality of green sheets; and before sintering the laminated body, but after laminating the plurality of green sheets, cutting the laminated body into a plurality of individual laminated body chips, wherein in the sintering, the plurality of individual laminated body chips are sintered.

It is to be understood that both the foregoing general description and the following detailed description are exemplary and explanatory, and are intended to provide further explanation of the invention as claimed.

DETAILED DESCRIPTION OF EMBODIMENTS

Various embodiments of the present invention will be described with reference to the drawings.

Figure 1:
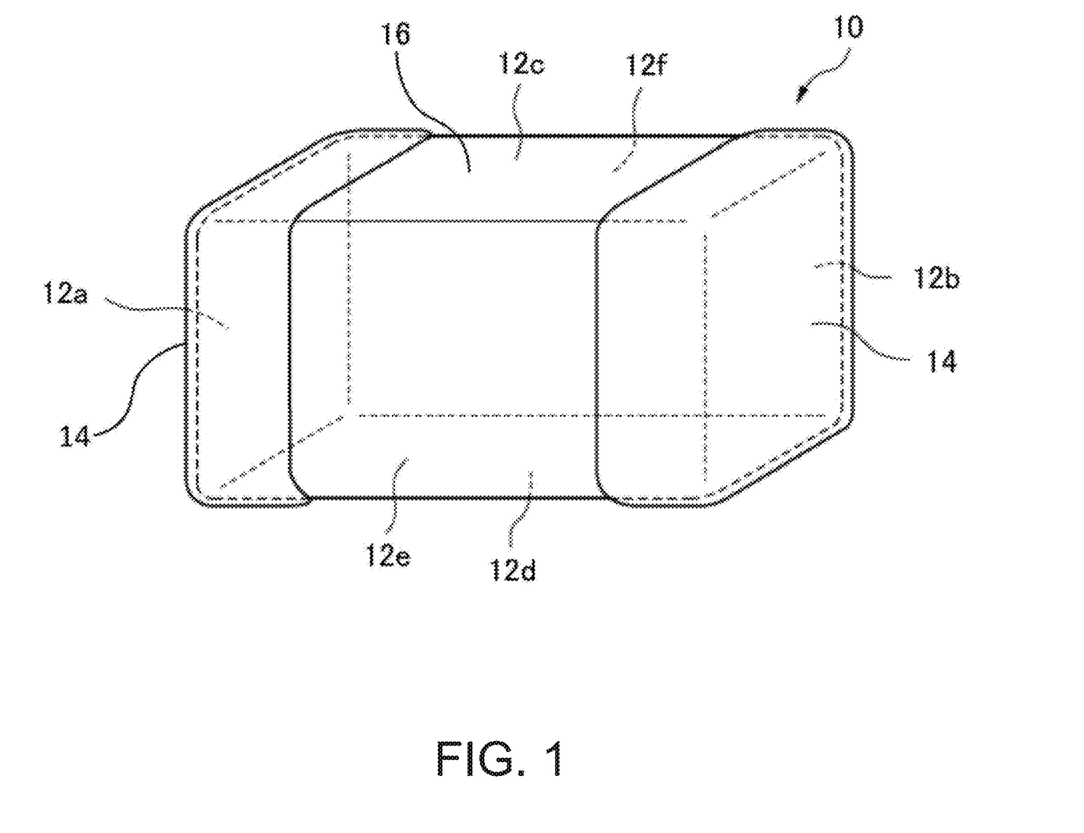
FIG. 1 is a perspective view of a multilayer ceramic capacitor according to an embodiment of the present invention.

FIG. 1 is a perspective view of a multilayer ceramic capacitor 10 according to an embodiment of the present invention.

As shown in FIG. 1, the multilayer ceramic capacitor 10 includes a generally cuboid-shaped main body 16. The main body has six surfaces. In this disclosure, the left and right surfaces of the main body 16, as shown in FIG. 1, are referred to as end surfaces 12a and 12b, respectively; the top and bottom surfaces are referred to as primary surfaces 12c and 12d, respectively; and the remaining surfaces are referred to as side surfaces 12e and 12f, respectively. In FIG. 1, the left-right directions are directions in which internal electrodes are extracted towards respective external electrodes 14.

Figure 2:
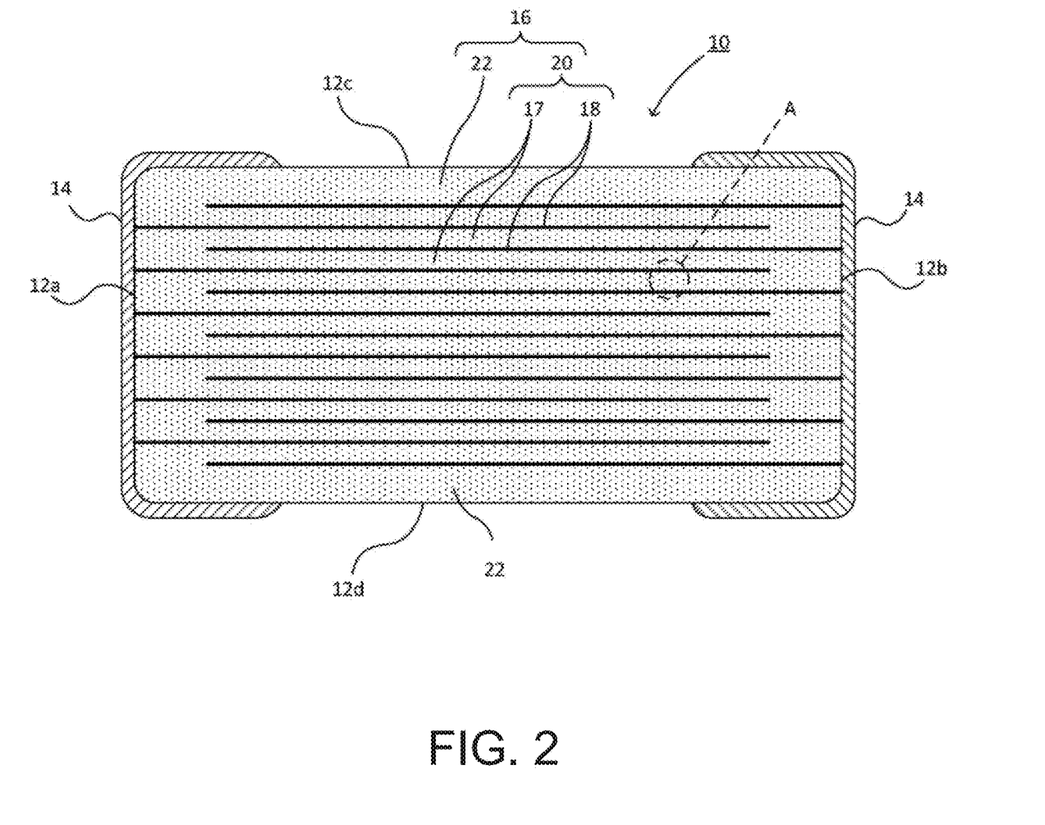
FIG. 2 is a cross-sectional view of the multilayer ceramic capacitor of FIG. 1, taken along a plane parallel to side surfaces.
Figure 3:
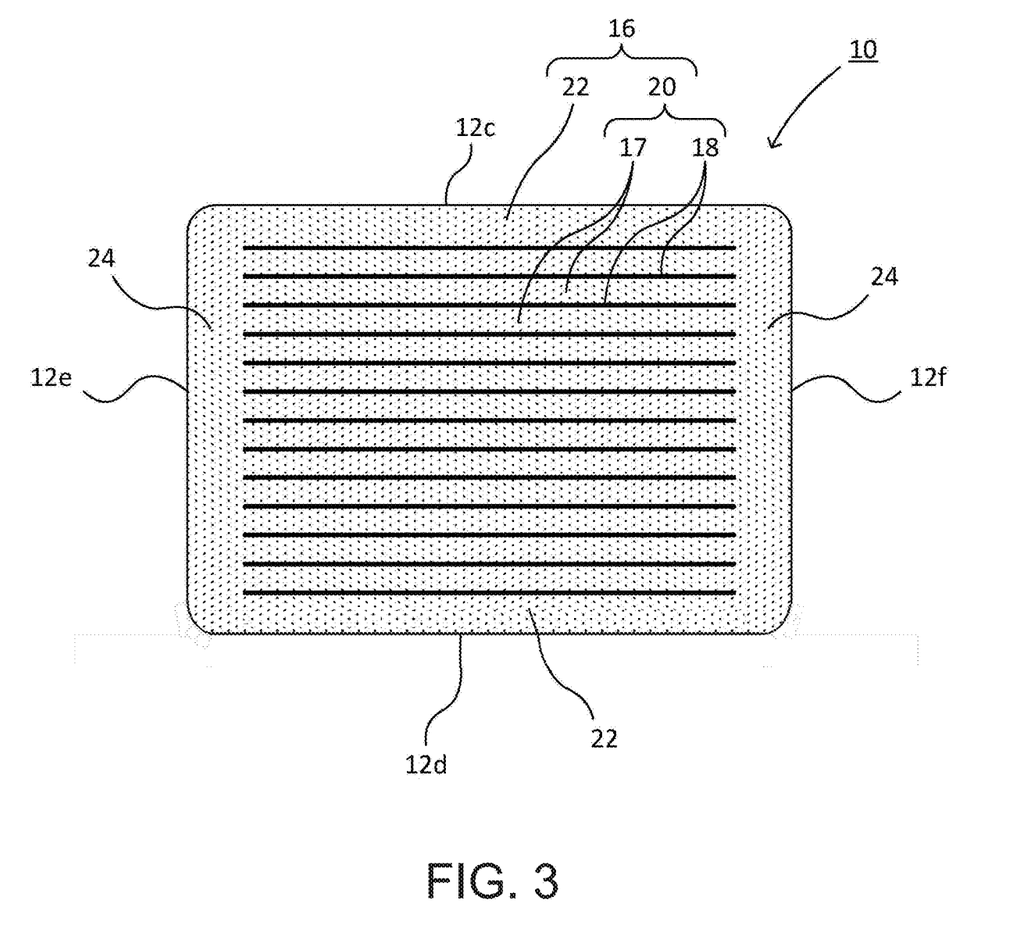
FIG. 3 is a cross-sectional view of the multilayer ceramic capacitor of FIG. 1, taken along a plane parallel to end surfaces.

FIG. 2 is a cross-sectional view of the multilayer ceramic capacitor 10 of FIG. 1, taken along a plane parallel to side surfaces 12e and 12f. FIG. 3 is a cross-sectional view of the multilayer ceramic capacitor 10 of FIG. 1, taken along a plane parallel to end surfaces 12a and 12b.

As shown in FIGS. 2 and 3, the multilayer ceramic capacitor 10 includes the main body 16 having dimensions and shape specified by the specifications (for example, a cuboid shape of 1.0 mm×0.5 mm×0.5 mm), and a pair of external electrodes 14 formed on the end surfaces 12a and 12b, respectively, of the main body 16.

The main body 16 has a laminated body 20, in which a plurality of dielectric layers 17 and a plurality of internal electrodes 18 are alternately laminated, and a pair of cover layers 22 formed on the top and bottom surfaces, respectively. The main body 16 further includes side margins 24 that cover the laminated body 20 (exposed lateral edges of the internal electrodes 18), forming a pair of side surfaces 12e and 12f (see, FIG. 3).

Within the main body 16, a plurality of internal electrodes 18 are laminated with dielectric layers 17 interposed therebetween. The ends of the plurality of internal electrodes 18 are extracted alternately to the left and right end surfaces 12a and 13b of the main body 16, respectively, and are electrically connected to two external electrodes 14, respectively.

The dielectric layer 17 includes, as the main components thereof, calcium strontium zirconate titanate $(Sr_{1-x}Ca_x)(Zr_{1-y}Ti_y)O_3$ (where 0<x<1, 0<y<1) and barium zirconate $(BaZrO_3)$. The regions of these two main components are observed as separate phases in cross sections of the main body 16. Here, the dielectric layer 17 may contain materials other than these main components. For example, the dielectric layer 17 may contain Si, Mn, etc., which are typically used as the sintering promoting agents.

The mole ratio of the total number of moles of strontium and calcium contained in the dielectric layer 17 to the number of moles of barium contained in the dielectric layer 17 is preferably 97:3 to 3:97, and more preferably, 97:3 to 77:23. (Here, the sum of the numbers of moles of strontium, calcium, and barium is set to 100.)

The main component of the internal electrodes 18 is, for example, a metal material that contains at least one of nickel, copper, palladium, platinum, silver, gold, tin, and an alloy made of these metals.

The main component of the external electrodes 14 is, for example, a metal material that contains at least one of nickel, copper, palladium, platinum, silver, gold, tin, and an alloy made of these metals. The external electrodes 14 may be formed of a plated nickel layer by electroplating nickel on an undercoat layer made of a metal material. A plated tin layer may be further formed on the electroplated nickel layer by electroplating.

The thickness of the internal electrodes 18 and the thickness of the dielectric layers 17 are set to be within prescribed ranges, depending on the static capacitance rating and the withstand voltage rating, etc., required for the multilayer ceramic capacitor 10. Although FIGS. 2 and 3 indicate only several internal electrodes 18 and dielectric layers 17, the number of layers in the laminated body 20 may in actuality be set to several hundreds to several thousands, for example.

The cover layers 22 and side margins 24 formed on the periphery of the laminated body 20 protect the dielectric layers 17 and the internal electrodes 18 from external moistures and contaminations of foreign objects.

The thickness of a single dielectric layer 17 is preferably 2 μm to 10 μm, and more preferably, 2 μm to 5 μm. When the dielectric layer 17 is within this range, because the thickness of the dielectric layer 17 is sufficiently small, the number of laminated dielectric layers 17 can be increased.

As a result, the capacitance of the multilayer ceramic capacitor 10 may be made large without increasing dimensions of the laminated body 20.

In the multilayer ceramic capacitor 10 of the present embodiment, although the thickness of the cover layers 22, the thickness of the side margins 24, and the thickness of the internal electrodes 18 are not particularly limited, the cover layers 22 are preferably 4 μm to 50 μm thick, the side margins 24 are preferably 4 μm to 50 μm thick, and the internal electrodes 18 are preferably 0.26 μm to 1.00 μm thick.

Figure 4:
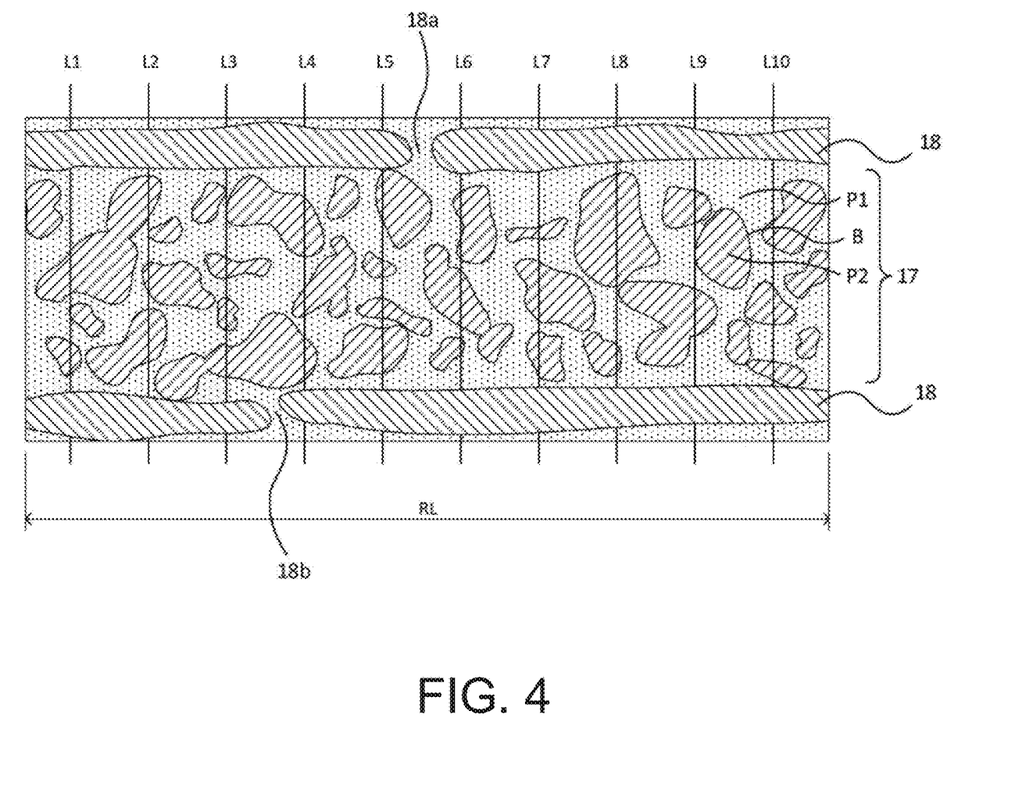
FIG. 4 is a magnified view of the part A of FIG. 2.

FIG. 4 is a magnified view of the part A of FIG. 2, schematically showing a cross section of a single dielectric layer 17 sandwiched between two internal electrodes 18 arranged in the up and down directions.

As shown in FIG. 4, the dielectric layer 17 includes a first phase P1 that contains calcium strontium zirconate titanate as its main component and a second phase P2 that contains barium zirconate as its main component. The first phase P1 and the second phase P2 do not dissolve with each other in most part, and therefore, the boundaries B between the first phase P1 and the second phase P2 can be recognized without difficulties.

The cross section of the dielectric layer 17 can be observed by a scanning electron microscope (SEM) having the function of obtaining backscattered electrons images to determine the compositions of specimens. In the scanning electron microscope, the first phase P1 is observed as gray areas, for example, and the second phase P2 is observed as white areas, for example. Because the contrast between the first phase P1 and the second phase P2 is large, the boundaries B between the first phase P1 and the second phase P2 can be recognized and determined with clarity. The cross sections of the dielectric layer 17 may also be observed by an energy dispersive X-ray spectroscopy (EDS) apparatus alternatively.

In the cross section of the dielectric layer 17, a third phase 13 having a dimension of about 50 nm or less may exist between the first phase P1 and the second phase P2. Such a third phase is formed by diffusion of elements in the one phase into the other phase in a minute amount, for example. Even with such a third phase between the first phase P1 and the second phase P2, effects and advantages of the present invention can be obtained.

In the multilayer ceramic capacitor 10 of the present embodiment, an average contact number, which is defined and determined by the below-enumerated steps (1) to (4) for a cross section of the single dielectric layer 17 sandwiched by the two upper and lower internal electrodes 18, is set to 1.0 or greater.

(1) Select a region of a prescribed length RL from the cross section of the dielectric layer 17, where the prescribed length RL is 30 μm or greater, specifying a length in a direction (the left-right direction in FIG. 4) perpendicular to the direction in which the dielectric layer 17 and the internal electrodes 18 are laminated.

(2) Draw, on the selected region of the cross section, ten or more straight lines that are parallel to the direction in which the dielectric layers 17 and the internal electrodes 18 are laminated (the up-down direction in FIG. 4) at an interval of 3 μm or greater. In FIG. 4, ten (10) lines L1 to L10 satisfying this condition are drawn.

If, as shown in FIG. 4, there are breaks 18a and 18b in the internal electrodes 18, the lines L1 to L10 should preferably be drawn by avoiding such breaks 18a and 18b. The breaks 18a and 18b are observed when the internal electrodes 18 have holes, for example.

(3) Count the total number of points of contact (contact points) at which these ten or more lines that have been drawn in step (2) contact the boundaries B between the first phase P1 and the second phase P2. A manner in which the total number of contact points is determined will be explained by referring to the example of FIG. 4.

FIG. 4 indicates the following:

The line L1 contacts the boundaries B between the first phase P1 and the second phase P2 at 6 points.

The line L2 contacts the boundaries B between the first phase P1 and the second phase P2 at 7 points.

The line L3 contacts the boundaries B between the first phase P1 and the second phase P2 at 8 points.

The line L4 contacts the boundaries B between the first phase P1 and the second phase P2 at 6 points.

The line L5 contacts the boundaries B between the first phase P1 and the second phase P2 at 8 points.

The line L6 contacts the boundaries B between the first phase P1 and the second phase P2 at 8 points.

The line L7 contacts the boundaries B between the first phase P1 and the second phase P2 at 6 points.

The line L8 contacts the boundaries B between the first phase P1 and the second phase P2 at 4 points.

The line L9 contacts the boundaries B between the first phase P1 and the second phase P2 at 5 points.

The line L10 contacts the boundaries B between the first phase P1 and the second phase P2 at 6 points.

Thus, the total number of contact points is 64.

(4) Calculate the average contact number N by dividing the total number of contact points that has been obtained in step (3) above by the number of the lines.

In the example of FIG. 4, the total number of contact points is 64, and the number of the lines is 10. Therefore, the average contact number N is 64/10=6.4.

As explained with reference to Table 1 below, the average contact number N of the multilayer ceramic capacitor 10 of the present embodiment that is determined by the above-described steps (1) to (4) is 1.0 or greater, preferably, 2.0 or greater, and more preferably, 3.0 or greater. The larger the average contact number N, the higher the reliability against dielectric breakdown of the multilayer ceramic capacitor 10.

Here, the average contact number N may be calculated in any cross section of any one of a plurality of dielectric layers 17 contained in the laminated body 20. It may be calculated from a cross section of the dielectric layer 17 that is close to one of the cover layers 22, or it may be calculated from a cross section of the dielectric layer 17 that is close to one of the side margins 24. The average contact number N may also be calculated from a cross section of the dielectric layer 17 taken about the center of the laminated body 20. If the average contact number N calculated from any cross section of any one of the plurality of dielectric layers 17 is 1.0 or greater, such a device is within the scope of the present invention.

The efficacies of the multilayer ceramic capacitor 10 of the instant embodiment as configured above will be explained.

According to the multilayer ceramic capacitor 10 of the present embodiment, the dielectric layers 17 include the first phase P1 that contains calcium strontium zirconate titanate as its main component and the second phase P2 that contains barium zirconate as its main component. Calcium strontium zirconate titanate has been known as a dielectric material suitable for temperature compensating use. Barium zirconate is a material having a superior resistance against reduction and can maintain a sufficient reliability against dielectric breakdown even if it is sintered in a reducing atmosphere. By mixing the two types of materials that have similar permittivities, but have different electronic properties, the reliability against dielectric breakdown of the resulting dielectric material can be improved while maintaining characteristics of the dielectric material (paraelectric) suitable for temperature compensating use.

According to the multilayer ceramic capacitor 10 of the present embodiment, in a cross section of a single dielectric layer 17 sandwiched between the upper internal electrode 18 and the lower internal electrode 18, there is one or more of the boundaries between the first phase P1 and the second phase P2 along a vertical straight line drawn from one of the internal electrodes to the other on average. That is, in a cross section of the dielectric layer 17, there is one or more of the second phase P2 having a higher reliability against dielectric breakdown along a path drawn from one of the internal electrodes to the other on average. Because of this, current is not likely to flow from one of the internal electrodes to the other. As a result, even when a high voltage is applied, dielectric breakdown is unlikely to occur, thereby significantly improving the reliability against dielectric breakdown of the multilayer ceramic capacitor 10.

Further, in the multilayer ceramic capacitor 10 of the present embodiment, as described below, the main body 16 is sintered in a condition under which the first phase P1 and the second phase P2 do not dissolve with each other. Therefore, during the sintering, grain growing reaction of materials included in the dielectric layers 17 does not progress. Because of this, the total volume change of the dielectric layers 17 during the sintering is reduced, and residual stress after the sintering is low. As a result, the mechanical reliability of the multilayer ceramic capacitor 10 can be improved.

Figure 5:
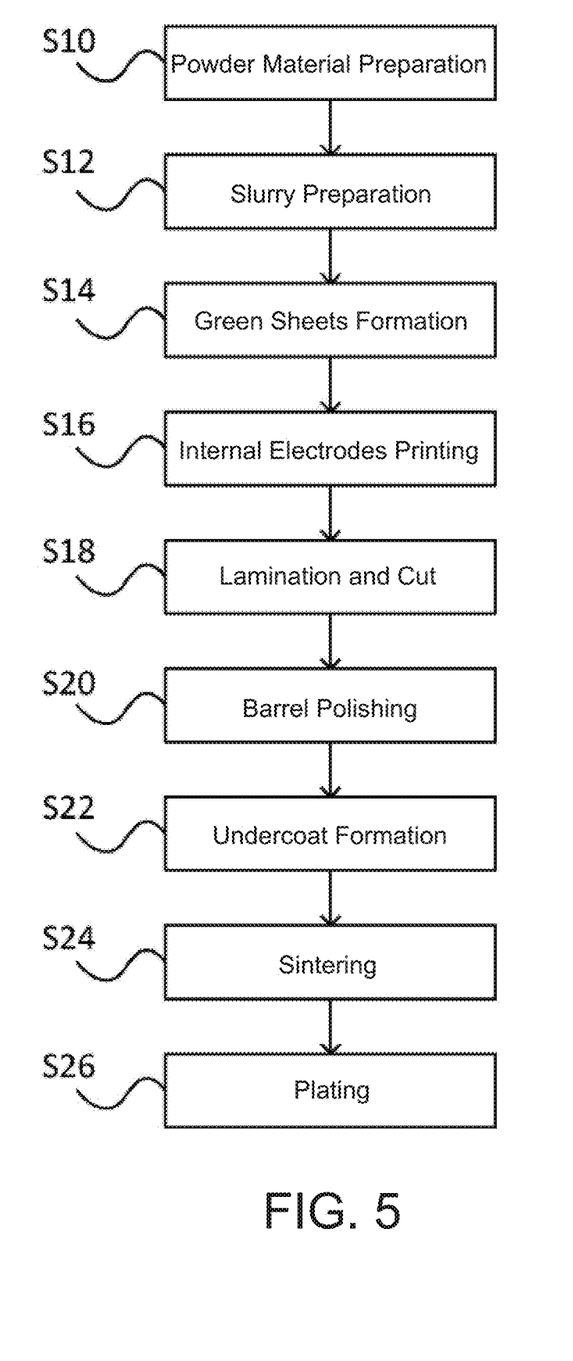
FIG. 5 is a flow chart showing an example of the manufacture method of the multilayer ceramic capacitor of FIG. 1.

An example of the manufacturing method of the above-described multilayer ceramic capacitor 10 of the present embodiment will be described with reference to a flowchart of FIG. 5.

<Powder Material Preparation: S10>

First, a powder material for forming the dielectric layers is prepared. Specifically, a first material that contains particles of calcium strontium zirconate titanate with an average particle diameter (d50) of 50 nm to 200 nm and a second material that contains particles of barium zirconate with an average particle diameter (d50) of 50 nm to 200 nm are mixed in a ratio of the total number of moles of strontium and calcium to the number of mole of barium being 97:3 to 3:97, more preferably 97:3 to 77:23. Here, the "average diameter" means the volume-based median diameter (d50) of sphere-approximated diameters. The "average particle diameter" can be measured by the laser diffraction and scattering method, for example.

The value obtained by dividing the average particle diameter (d50) of the first material by the average particle diameter (d50) of the second material is preferably 0.8 to 1.2. That is, it is preferable that the average particle diameter (d50) of one of the materials be 80% to 120% of the average particle diameter (d50) of the other material. When the first material and the second material satisfy this condition, the first material and the second material can be mixed more uniformly. As a result, it becomes possible to manufacture multilayer ceramic capacitors having high reliabilities against dielectric breakdown.

Sintering promoting agents, such as Mn and Si, may be added to the powder obtained by mixing the first material and the second material. Mn and Si may be added in the form of oxides, respectively. The blending ratio of each of Mn and Si may be preferably within a range of 0.1 mol % to 5.0 mol % with the total amount of the first material and the second material being 100 mol %.

<Slurry Preparation: S12>

A dispersant, a binder, and an organic solvent are added to the powder material prepared at step S10 so as to form a slurry. As the dispersant, the ammonium salt of a polycarboxylic acid may be used, for example. As the binder, a polyvinyl butyral resin or a polyvinyl acetal resin may be used, for example. As the organic solvent, ethanol and/or toluene may be used, for example. In order to disperse the powder material in the slurry uniformly, a bead mill may be used to mix the slurry.

<Green Sheets Formation: S14>

On a carrier film, which may be a PET (polyethylene terephthalate) film, the slurry obtained at step S12 is coated into a shape of a sheet by the doctor blade method and dried so as to form a mother green sheet. The mother green sheet is preferably 0.4 μm to 15 μm thick.

<Internal Electrodes Printing: S16>

Among a plurality of regions on the mother green sheet that will later become individual green sheets, on select green sheet regions on which internal electrodes 18 are to be formed, an electrically conductive paste is formed to a prescribed pattern by screen printing, inkjet printing, or gravure printing. By this, a pattern for forming an internal electrode 18 is formed on each of such green sheet regions. The main component of the electrically conductive paste is Ni or Cu, for example.

<Lamination and Cut: S18>

The green sheets on which the pattern is formed and the green sheets on which no pattern is formed are cut out from the mother green sheet to a size that is suitable for handling. Thereafter, the green sheets on which the pattern is formed and the green sheets for forming cover sheets on which no pattern is formed are laminated plural times in a prescribed order. A plurality of the green sheets on which no pattern is formed are laminated on the upper side and on the lower side, respectively. Here, the plurality of the green sheets on which the pattern is formed is laminated such that the positions of the internal electrodes are shifted alternately so that the ends of the internal electrodes are exposed to the respective end surfaces for connecting to the external electrodes alternately. The resultant laminated body obtained by laminating the plurality of green sheets this way is cut into separate individual chip sizes so as to obtain a plurality of separate individual laminated body chips. Here, the cutting process may be performed by a known method, such as pressed cutting or blade dicing.

<Barrel Polishing: S20>

The laminated body chips obtained at step S18 are barrel-polished. By this polishing, the main body 16 and external electrodes will be more firmly affixed to each other. Further, this can prevent chipping of corners of the main body 16.

<Undercoat Formation: S22>

On the end surfaces of the laminated body chip that has been polished at step S20, an electrically conductive paste is coated and dried, thereby forming undercoats for the external electrodes that are to be formed after sintering. As such a paste, an electrically conductive paste that includes Ni may be used, for example.

<Sintering: S24>

The laminated body chip that has been coated with the electrically conductive paste at step S22 is sintered in a reducing atmosphere containing hydrogen. This forms the main body 16 in which the dielectric layers made of ceramic and the internal electrodes are integrated. The sintering is performed in such a condition that the first phase P1 and the second phase P2 hardly dissolve with each other, leaving intact the boundaries between the first phase P1 and the second phase P2. For example, the sintering is performed at the internal temperature of a sintering furnace of 1220° C. to 1280° C. for a duration of 3 min to 5 min. When the sintering is performed under this condition, boundaries between the first phase P1 and the second phase P2 exist and are clearly observable when cross sections of the dielectric layers 17 are observed in the resultant main body 16.

<Plating: S26>

On the respective surfaces of the undercoats formed on the end surfaces of the main body that has been obtained at step S24, electroplating layers of Cu, Ni, and Sn are formed by electroplating in that order. Specifically, a plurality of the main bodies obtained at step S24 is put in a barrel together with an electroplating solution. Thereafter, while rotating the barrel, current is caused to pass through the electroplating solution. This way, electroplating layers can be formed on the undercoats on both end surfaces of the main body. Here, the Ni plating is formed in order to improve the heat resistance of the external electrodes during soldering. The Sn plating is formed in order to improve the wettability of the external electrodes.

In the manufacturing example described above, the electrically conductive paste is coated on the end surfaces to form the undercoats for the external electrodes before sintering the main body. However, the present invention is not limited thereto. For example, after sintering the main body, an electrically conductive past (Cu paste, for example) for forming external electrodes may be coated on the end surfaces and may be baked thereafter.

The above-described steps complete the formation of the multilayer ceramic capacitor 10 of the present embodiment.

WORKING EXAMPLES

Working examples of the present invention are described below.

First, the following two types of materials for forming the dielectric layers were prepared First Material: Powder of $Sr_{0.3}Ca_{0.7}Zr_{0.97}Ti_{0.03}O_3$ Second Material: Powder of $BaZrO_3$ After adjusting the average particle diameter (d50) of these two materials to 100±20 nm, these two materials were mixed in various mixing ratios shown in Table 1 below. Further, the mixed materials were added with Mn: 2 mol % and Si: 3 mol % in the form of oxides (here, the total of Sr, Ca, and Ba is set to 100 mol %). It was confirmed that these material ratios were consistent with results of ICP analysis on the resultant multilayer ceramic capacitors. It was also confirmed that these material ratios were consistent with results of quantitative analysis by surface analysis of cross sections of the resultant multilayer ceramic capacitors.

Using the thus prepared materials, multilayer ceramic capacitors were manufactured by the above-described manufacture method. In Working Examples 1 to 4 and Comparison Examples 1 to 2, the thickness of the individual dielectric layer was adjusted to 9.2 μm. In Working Examples 5 to 8 and Comparison Examples 3 to 4, the thickness of the individual dielectric layer was adjusted to 2.5 μm. The thickness of the individual dielectric layer was adjusted by appropriately setting the thickness of the green sheets.

Cross sections of the thus manufactured multilayer ceramic capacitors were taken and polished. Thereafter, the cross sections were imaged by a scanning electron microscope with the magnification of 10,000 times. Using the cross sections image, the average contact number N was calculated for each capacitor. Table 1 below shows the calculation results of the average contact number N. Here, for all of the Working Examples and the Comparison Examples, the cross sections of a dielectric layer used in calculating the average contact number N were located at about the same location within the respective laminated bodies.

Figure 6:
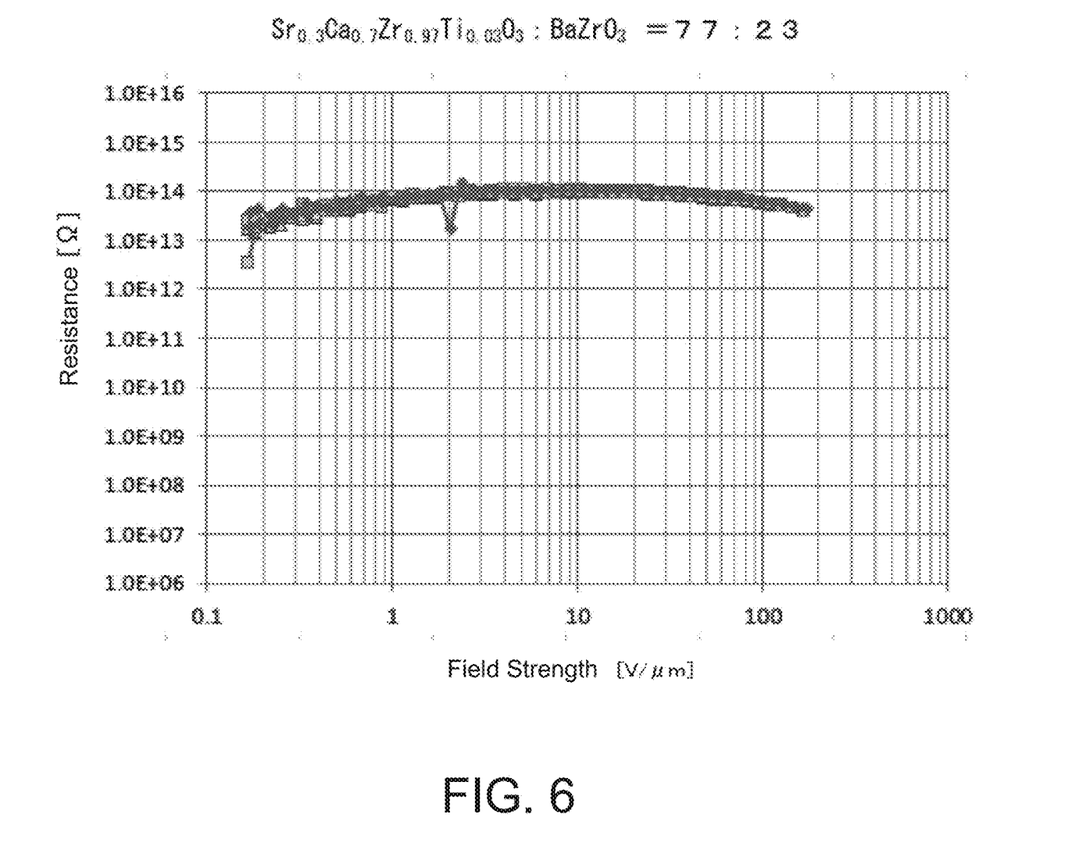
FIG. 6 shows voltage characteristics of a multilayer ceramic capacitor manufactured using a material in which calcium strontium zirconate titanate and barium zirconate are mixed in a ratio of 77:23 according to an embodiment of the present invention.
Figure 7:
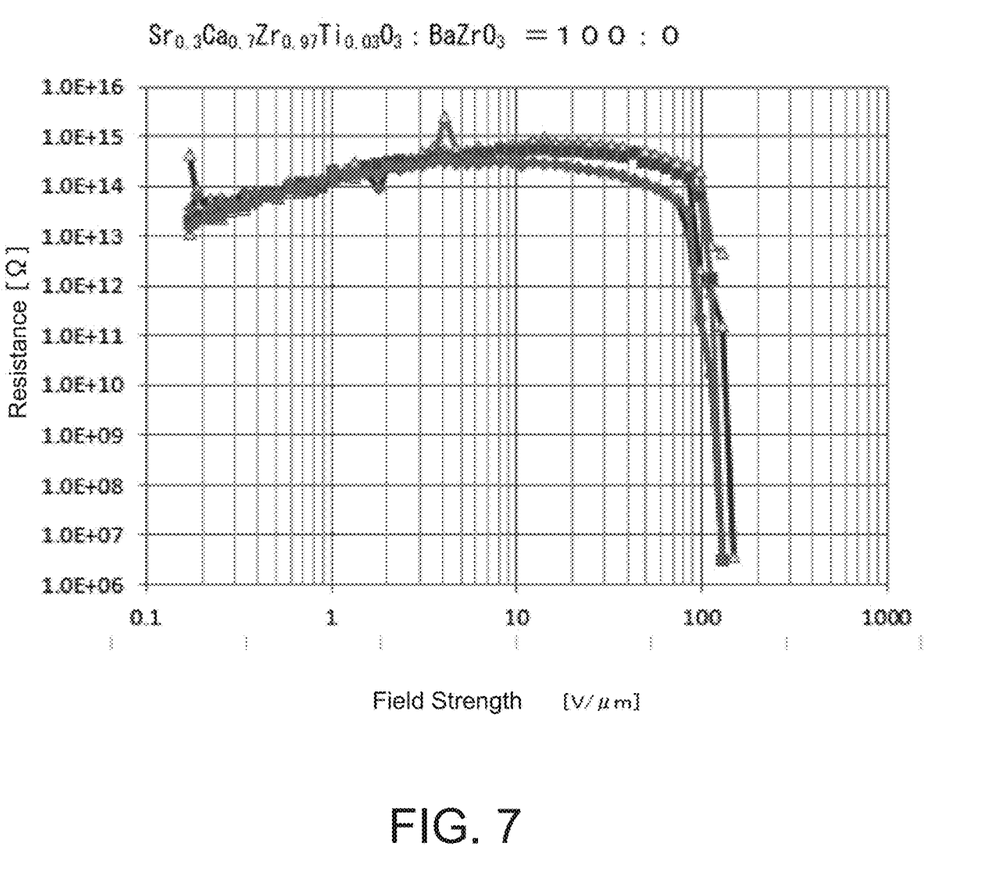
FIG. 7 shows a voltage characteristics of a multilayer ceramic capacitor manufactured using calcium strontium zirconate titanate only, as a comparison example.

Then, by applying a voltage between the external electrodes of the thus manufactured multilayer ceramic capacitor, the voltage characteristics of each multilayer ceramic capacitor were obtained. FIG. 6 shows the voltage characteristics of a multilayer ceramic capacitor manufactured using the mixed material in which the first material and the second material were mixed in a ratio of 77:23. FIG. 7 shows the voltage characteristics of a multilayer ceramic capacitor manufactured using the first material only, as a comparison example. In FIGS. 6 and 7, the horizontal axis indicates the applied voltage per unit thickness (i.e., electric field strength) in V/μm, and the vertical axis shows the measured resistance in Ω. In the multilayer ceramic capacitors shown in FIGS. 6 and 7, the sintering temperatures were varied as 1230° C., 1250° C., and 1270° C. The resistances in response to voltages applied to the external electrodes were measured at room temperature.

The reliability against dielectric breakdown of the respective multilayer ceramic capacitors was evaluated by applying various voltages between the external electrodes. Specifically, the voltage at which dielectric breakdown occurs was measured by gradually increasing the voltage applied between the external electrodes of the multilayer ceramic capacitor. The voltage at which the dielectric breakdown occurred for each sample was divided by the average thickness of the dielectric layers so as to convert the breakdown voltage to the voltage value per 1 μm of the dielectric layer—i.e., the electrical field strength—so that the reliability against dielectric breakdown could be evaluated among the Working Examples and Comparison Examples.

When the dielectric breakdown occurred at the voltage (field strength) of 150 V/μm or greater, it was determined that the reliability against dielectric breakdown is sufficient (indicated by ○ in the Table 1).

When the dielectric breakdown occurred at the voltage (field strength) of less than 150 V/μm, it was determined that the reliability against dielectric breakdown is sufficient (indicated by x in the Table 1).

The results of the dielectric breakdown reliability evaluations were shown in Table 1 below.

TABLE 1

| | $Sr_{0.3}Ca_{0.7}Zr_{0.97}Ti_{0.03}O_3$ (Mol %) | $BaZrO_3$ (Mol %) | Average Contact Number N (Dielectric layer thickness: 9.2 μm) | Dielectric Strength |
|---|---|---|---|---|
| Working Example 1 | 77 | 23 | 9.4 | ○: 150 V/μm or greater |
| Working Example 2 | 50 | 50 | 14.2 | ○: 150 V/μm or greater |
| Working Example 3 | 97 | 3 | 5.5 | ○: 150 V/μm or greater |
| Working Example 4 | 3 | 97 | 5.9 | ○: 150 V/μm or greater |

TABLE 1-continued

| | $Sr_{0.3}Ca_{0.7}$ $Zr_{0.97}Ti_{0.03}O_3$ (Mol %) | $BaZrO_3$ (Mol %) | Average Contact Number N (Dielectric layer thickness: 2.5 μm | Dielectric Strength |
|---|---|---|---|---|
| Comparison Example 1 | 99 | 1 | 0.8 | x: less than 150 V/μm |
| Comparison Example 2 | 100 | 0 | 0 | x: less than 150 V/μm |
| Working Example 5 | 77 | 23 | 3.7 | ○: 150 V/μm or greater |
| Working Example 6 | 50 | 50 | 5.9 | ○: 150 V/μm or greater |
| Working Example 7 | 97 | 3 | 2.1 | ○: 150 V/μm or greater |
| Working Example 8 | 3 | 97 | 1.2 | ○: 150 V/μm or greater |
| Comparison Example 3 | 99 | 1 | 0.4 | x: less than 150 V/μm |
| Comparison Example 4 | 100 | 0 | 0 | x: less than 150 V/μm |

As shown in FIG. 6, in the multilayer ceramic capacitors manufactured using a mixture of the first material ($Sr_{0.3}Ca_{0.7}$ $Zr_{0.97}Ti_{0.03}O_3$) and the second material ($BaZrO_3$) in a mixing mole ratio of 77:23, dielectric breakdown did not occur even with the electrical field strength of at and above 100 V/μm, indicating an excellent reliability against dielectric breakdown. In contrast, as shown in FIG. 7, in the multilayer ceramic capacitors manufactured using the first material ($Sr_{0.3}Ca_{0.7}$ $Zr_{0.97}Ti_{0.03}O_3$) only, dielectric breakdown occurred at the electrical field strength of about 100 V/μm, showing a poor reliability against dielectric breakdown.

As seen from Table 1, dielectric breakdown did not occur at the applied electric field strength of 150V/μm and above in Working Examples 1 to 8 in which the average contact number N is 1.0 or greater, indicating an excellent reliability against dielectric breakdown. In contrast, dielectric breakdown occurred at the applied electric field strength of less than 150V/μm in Comparison Examples 1 to 4 in which the average contact number N is less than 1.0, indicating a poor reliability against dielectric breakdown.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multilayer ceramic capacitor, comprising:
   a laminated body in which dielectric layers and internal electrodes are laminated alternately in a prescribed direction;
   a pair of external electrodes disposed on the laminated body to respectively connect to different sets of the internal electrodes in the laminated body,
   wherein each of the dielectric layers includes a first phase that has calcium strontium zirconate titanate as a main component thereof and a second phase that has barium zirconate as a main component thereof such that boundaries exist between the first phase and the second phase, and
   wherein at a cross section of the laminated body taken along a plane parallel to the prescribed direction, an average contact number that is defined and determined by prescribed steps for at least one of the dielectric layers that are sandwiched by the internal electrodes is 1.0 or greater, said prescribed steps including:
   (a) selecting, from the cross section, a region having a prescribed length and containing a single pair of the internal electrodes sandwiching one of the dielectric layers, wherein the prescribed length is 30 μm or greater, as measured in a direction perpendicular to the prescribed direction in which the dielectric layers and the internal electrodes are laminated;
   (b) drawing, on the selected region of the cross section, ten or more straight lines that are parallel to the prescribed direction in which the dielectric layers and the internal electrodes are laminated at an interval of 3 μm or greater;
   (c) counting a total number of points of contact at which the respective ten or more straight lines contact the boundaries between the first phase and the second phase; and
   (d) calculating the average contact number by dividing said total number of points of contact obtained in step (c) by a number of the straight lines.

2. The multilayer ceramic capacitor according to claim 1, wherein said average contact number is 2.0 or greater.

3. The multilayer ceramic capacitor according to claim 2, wherein a thickness of each of the dielectric layers is 2 μm to 10 μm.

4. The multilayer ceramic capacitor according to claim 1, wherein in each of the dielectric layers, a mole ratio of a total number of moles of strontium and calcium to a number of moles of barium is 97:3 to 3:97.

5. The multilayer ceramic capacitor according to claim 4, wherein in each of the plurality of dielectric layers, the mole ratio of the total number of moles of strontium and calcium to the number of moles of barium is 97:3 to 77:23.

* * * * *